(12) United States Patent
Kunitomo et al.

(10) Patent No.: US 10,930,200 B2
(45) Date of Patent: *Feb. 23, 2021

(54) CONNECTION DEVICE, DISPLAY DEVICE, AND CONTROL METHOD FOR THE DISPLAY DEVICE

(71) Applicant: SEIKO EPSON CORPORATION, Tokyo (JP)

(72) Inventors: Yuichi Kunitomo, Matsumoto (JP); Takehiro Ono, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,797

(22) Filed: May 6, 2020

(65) Prior Publication Data

US 2020/0265775 A1 Aug. 20, 2020

Related U.S. Application Data

(63) Continuation of application No. 16/408,889, filed on May 10, 2019, now Pat. No. 10,685,595.

(30) Foreign Application Priority Data

May 11, 2018 (JP) .............................. JP2018-091877

(51) Int. Cl.
*G09G 3/20* (2006.01)
*G02B 27/01* (2006.01)

(52) U.S. Cl.
CPC ....... *G09G 3/2092* (2013.01); *G02B 27/0172* (2013.01); *G02B 2027/0138* (2013.01); *G02B 2027/0178* (2013.01)

(58) Field of Classification Search
CPC .............. G09G 3/2092; G02B 27/0172; G02B 2027/0138; G02B 2027/0178
See application file for complete search history.

(56) References Cited

U.S. PATENT DOCUMENTS

| | | |
|---|---|---|
| 8,972,626 B2 | 3/2015 | Sasaki et al. |
| 2006/0001776 A1 | 1/2006 | Araki |
| 2011/0063194 A1 | 3/2011 | Nakazawa |
| 2012/0320275 A1 | 12/2012 | Sasaki et al. |
| 2013/0336631 A1 | 12/2013 | Kura |
| 2016/0165220 A1 | 6/2016 | Fujimaki et al. |
| 2018/0176632 A1 | 6/2018 | Yang et al. |

FOREIGN PATENT DOCUMENTS

JP 2006-019947 A 1/2006

*Primary Examiner* — Michael Pervan
(74) *Attorney, Agent, or Firm* — Oliff PLC

(57) ABSTRACT

A connection device connected to an image display unit that is head-mounted includes a connector to which an image signal is input; and a connector to which an image signal is input and which is capable of outputting sensor data. The connection device further includes a setting unit that sets a selection between the image signals; and an output control unit that selects the connector for outputting the image signal by a connection unit according to the setting. The setting unit sets the image signal to be output from the connection unit when the image signal is input.

10 Claims, 8 Drawing Sheets

CONNECTION DEVICE, DISPLAY DEVICE, AND CONTROL METHOD FOR THE DISPLAY DEVICE

CROSS-REFERENCE TO RELATED APPLICATION(S)

This application is a continuation of U.S. application Ser. No. 16/408,889 filed May 10, 2019, which is based on and claims priority under 35 U.S.C. 119 from Japanese Patent Application No. 2018-091877 filed on May 11, 2018. The contents of the above applications are incorporated herein by reference.

BACKGROUND

1. Technical Field

The present disclosure relates to a connection device, a display device, a control method for the connection device, and a control method for the display device.

2. Related Art

A display device that displays an image based on a signal input from an external device is known (see, for example, JP-A-2006-19947). A television receiver described in JP-A-2006-19947 receives a plurality of signals through a signal cable, sets a change-over switch according to an instruction from a user, and automatically selects a signal according to the setting.

In a configuration described in JP-A-2006-19947, the user needs to perform setting in order to select a signal automatically.

SUMMARY

An advantage of the present disclosure is to select and display an image input from a plurality of devices by a method that does not require setting by a user.

To solve the problems described above, the present disclosure provides a connection device connected to a display device that is head-mounted, the connection device including a first connection unit to which a first image signal is input, a second connection unit to which a second image signal is input and which is configured to perform at least one of input and output of data relating to an input device included in the display device, an output unit configured to output to the display device one of the first image signal input to the first connection unit and the second image signal input to the second connection unit, a setting unit configured to set a selection between the first image signal and the second image signal, and an output control unit configured to select a connection unit that outputs an image signal by the output unit according to the setting by the setting unit, wherein the setting unit sets to output from the output unit the first image signal input to the first connection unit when image signals are input to both of the first connection unit and the second connection unit.

Further, the present disclosure may be a configuration where the setting unit changes the setting of the selection between the first image signal and the second image signal based on a history of outputting the first image signal to the display device by the output unit and a history of outputting the second image signal to the display device by the output unit.

Further, the present disclosure may be a configuration where the setting unit counts an output time of outputting the first image signal to the display device by the output unit and an output time of outputting the second image signal to the display device by the output unit, and changes the setting of the selection between the first image signal and the second image signal based on a length of the output time.

Further, the present disclosure may be a configuration including a detecting unit configured to detect a first external device connected to the first connection unit and a second external device connected to the second connection unit, wherein the setting unit counts the output time of outputting the first image signal to the display device by the output unit in association with the first external device, and counts the output time of outputting the second image signal to the display device by the output unit in association with the second external device.

Further, to solve the problems described above, the present disclosure provides a display device that is head-mounted including an image display unit configured to display an image, a first connection unit to which a first image signal is input, a second connection unit to which a second image signal is input and which is configured to perform at least one of input and output of data relating to an input device included in the image display unit, an output control unit configured to display an image by the image display unit based on one of the first image signal input to the first connection unit and the second image signal input to the second connection unit, and a setting unit configured to set a selection between the first image signal and the second image signal, wherein the output control unit selects one of the first connection unit and the second connection unit according to the setting by the setting unit and displays an image by the image display unit, and the setting unit sets the first image signal to be input to the first connection unit to be selected when image signals are input to both of the first connection unit and the second connection unit.

Further, to solve the problems described above, the present disclosure provides a control method for a connection device that is connected to a display device that is head-mounted and includes a first connection unit to which a first image signal is input, a second connection unit to which a second image signal is input and which is configured to perform at least one of input and output of data relating to an input device included in the display device, and an output unit configured to output an image signal to the display device, the control method including setting a selection between the first image signal and the second image signal, selecting a connection unit configured to output an image signal by the output unit according to the setting, selecting one of the first image signal input to the first connection unit and the second image signal input to the second connection unit, and outputting the selected image signal from the output unit to the display device, and setting the first image signal input to the first connection unit to be output from the output unit when image signals are input to both of the first connection unit and the second connection unit.

Further, to solve the problems described above, the present disclosure provides a control method for a display device that is head-mounted and includes an image display unit configured to display an image, a first connection unit to which a first image signal is input, and a second connection unit to which a second image signal is input and which is configured to perform at least one of input and output of data relating to an input device included in the image display unit, the control method including setting a selection between the first image signal and the second image signal, selecting one of the first connection unit and the second connection unit according to the setting, displaying an image by the image display unit based on an image signal selected from the first image signal input to the first connection unit and the second image signal input to the second connection unit, and setting the first image signal to be input to the first connection unit to be selected when image signals are input to both of the first connection unit and the second connection unit.

The present disclosure can be realized in various embodiments other than the connection device, the display device, the control method for the connection device, and the control method for the display device described above. For example, it may be realized as a program for executing the above display method by a computer. Further, it can be realized in an embodiment of a recording medium in which the program is recorded, a server device for delivering the program, a transmission medium for transmitting the program, a data signal in which the program is embodied on a carrier wave, and the like.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

1. First Exemplary Embodiment 1-1. Configuration of Display System

Figure 1:
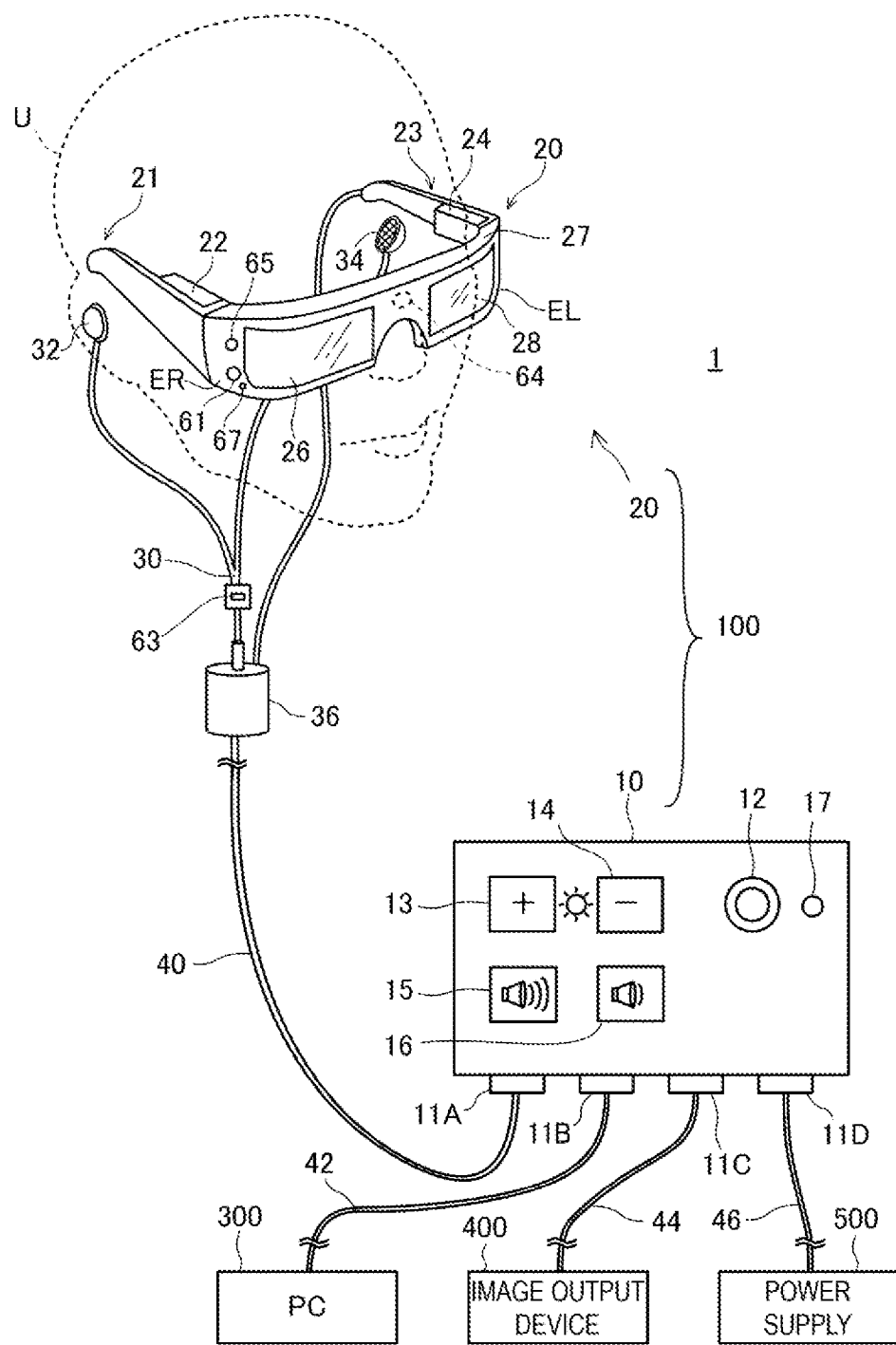
FIG. 1 is a diagram illustrating a schematic configuration of a display system according to First Exemplary Embodiment.

FIG. 1 is a diagram illustrating a schematic configuration of a display system 1 according to First Exemplary Embodiment to which the present disclosure is applied.

The display system 1 includes an HMD 100 which is a head-mounted display device. HMD is an abbreviation for Head Mounted Display. The HMD 100 includes an image display unit 20 mounted on a head of a user and a connection device 10 and causes the user to visually recognize a virtual image with the image display unit 20 in a state of being mounted on the head of the user. The image display unit 20 corresponds to a display device of the present disclosure. In the following description, the user refers to a user who wears and uses the HMD 100.

The connection device 10 includes connectors 11A, 11B, 11C, and 11D in a box-shaped case, and the image display unit 20 is connected to the connector 11A via a display unit connecting cable 40. Hereinafter, in a case where the connectors 11A, 11B, 11C, and 11D are not distinguished, the connectors 11A, 11B, 11C, and 11D will be referred to as connectors 11. The case of the connection device 10 can be referred to as a housing or a main body.

The display system 1 is a system configured by connecting an external device to the HMD 100. The connectors 11B, 11C and 11D are interfaces to which external devices of the HMD 100 are connected. Although the type of the external device connected to the HMD 100 is not limited, in the present exemplary embodiment, as an example, a PC 300 is connected to the connector 11B, an image output device 400 is connected to a right display unit 22, and a power supply device 500 is connected to the connector 11D. PC is an abbreviation for Personal Computer. The PC 300 and the image output device 400 can be referred to as information processing devices. Note that, the PC 300 and the image output device 400 are merely examples of the external devices. For example, a desktop PC, a notebook PC, a tablet PC, a smartphone, and the like may be connected to the connection device 10 as a first external device and/or a second external device. Further, a stick-type PC to which a display device and an input device are externally connected may be connected to the connection device 10 as the first external device and/or the second external device.

The connectors 11 are wired interfaces to be connected to a communication cable, and the connection device 10 is connected to the external device via the communication cable. The connector 11A includes a terminal configured to connect the display unit connection cable 40 and an interface circuit configured to transmit and receive a signal via the connector 11A. Similarly, the connector 11B includes a terminal configured to connect a cable and an interface circuit configured to transmit and receive a signal via the connector 11B. The same applies to the connectors 11C and 11D as well.

Here, the connector 11B corresponds to the second connection unit, and the connector 11C corresponds to the first connection unit. The connector 11B is an interface to which the image signal 301 is input, wherein the interface is configured to output sensor data 302, but whether to actually output the sensor data 302 differs depending on the device connected to the connector 11B. In other words, the connector 11B corresponds to the second connection unit since it is capable of outputting the sensor data 302, and the connector 11B corresponds to the second connection unit even in a state where the sensor data 302 are not actually output. The connector 11A can be referred to as a display device connection unit, and the connector 11D can be referred to as a power supply connection unit.

The connector 11A is provided to connect the image display unit 20 to the connection device 10. The display unit connection cable 40 performs to supply power with respect to the image display unit 20 from the connection device 10, and the display unit connection cable 40 has a function of mutually transmitting and receiving data between the image display unit 20 and the connection device 10.

For example, the connectors 11B, 11C and 11D are connectors conforming to a known communication interface standard, and the connectors may be connectors having the same shape or may be connectors having different types.

In the present exemplary embodiment, as an example, the connector 11B is an interface corresponding to input and output of image data and various data and is connected to the PC 300 via a first connection cable 42. The connector 11C is an interface corresponding to the input/output of image data and is connected to the image output device 400 via a second connection cable 44. The connector 11D is an interface corresponding to power supply with respect to at least the connection device 10 and is connected to the power supply device 500 via a third connection cable 46.

For example, a connector of a USB-Type C standard can be adopted as the connector 11B. The interface corresponding to the USB-Type C is capable of transmitting data according to a USB 3.1 standard and supplying a direct current within 20 volts and 5 amperes. Also, as a function of an alternative mode of the USB-Type C, the interface is capable of transmitting image data of an HDMI standard, image data of an MHL standard, and the like. The PC 300 is capable of supplying power, transmitting and receiving data, supplying streaming data of image and sound, and the like via the first connection cable 42. Here, USB is an abbreviation for Universal Serial Bus. MHL is an abbreviation for Mobile High-definition Link, and HDMI is an abbreviation for High Definition Multimedia Interface. The alternative mode of USB-Type C is known as Alternative mode. HDMI is a registered trademark.

For example, a connector conforming to the HDMI standard can be adopted as the connector 11C. Further, the connector 11D can adopt a connector of the USB-Type C standard or a MicroUSB connector. A connector of an interface standard capable of transmitting data and supplying power can be adopted as the connector 11D, and the connection device 10 can be configured to perform only supplying power by the connector 11D.

In the example illustrated in FIG. 1, an image output device 400 that outputs streaming data of image and sound by the second connection cable 44 is connected to the connector 11C. The image output device 400 is a device for playing content data recorded on a disc type recording medium such as CD or DVD. Further, a power supply device 500 that outputs a DC power supply of 5 volts is connected to the connector 11D via the third connection cable 46, and the connection device 10 receives power supply by the connector 11D. In this configuration example, the image output device 400 corresponds to the first external device, and the PC 300 corresponds to the second external device.

In the present exemplary embodiment, the image display unit 20 has an eyeglasses-like shape. The image display unit 20 includes the right display unit 22, a left display unit 24, a right light-guiding plate 26, and a left light-guiding plate 28 on a main body including a right holding part 21, a left holding part 23, and a front frame 27.

The right display unit 22 and the left display unit 24 constitute the image display unit of the present disclosure. That is, only one of the right display unit 22 and the left display unit 24 may be used as the image display unit, or the combination of the right display unit 22 and the left display unit 24 may be configured to correspond to the image display unit.

The right holding part 21 and the left holding part 23 extend to a rearward side from both ends of the front frame 27 and hold the image display unit 20 on the head U of the user. In both ends of the front portion frame 27, when the image display unit 20 is mounted, the end located at the right side of the head U is defined as an end ER, while the end located at the left side is defined as an end EL. The right holding part 21 is provided to extend from the end ER of the front frame 27 to a position corresponding to a right side head part of the user in the state where the image display unit 20 is mounted. The left holding part 23 is provided to extend from the end EL to a position corresponding to a left side head part of the user in the state where the image display unit 20 is mounted.

The right light-guiding plate 26 and the left light-guiding plate 28 are provided on the front frame 27. The right light-guiding plate 26 is located in front of the right eye of the user in the state where the image display unit 20 is mounted, and the right light-guiding plate 26 allows the right eye to visually recognize the image. The left light-guiding plate 28 is located in front of the left eye of the user in the state where the image display unit 20 is mounted, and the left light-guiding plate 28 allows the left eye to visually recognize the image.

The front frame 27 has a shape coupling one end of the right light-guiding plate 26 and one end of the left light-guiding plate 28 to each other, and this coupling position corresponds to a portion between eyebrows of the user in the mounted state where the user wears the image display unit 20. The front frame 27 may be provided with a nose pad, in the coupling position of the right light-guiding plate 26 and the left light-guiding plate 28, configured to abut on a nose of the user in the state where the image display unit 20 is mounted. In this case, the image display unit 20 can be held on the head of the user by the nose pad, the right holding part 21, and the left holding part 23. Further, a belt, configured to be in contact with a back head part of the user in the state where the image display unit 20 is mounted, may be coupled to the right holding part 21 the left holding part 23, and, in this case, the image display unit 20 can be held on the head of the user by the belt.

Each of the right display unit 22 and the left display unit 24 is a module obtained by unitizing an optical unit and a peripheral circuit.

The right display unit 22 is a unit related to display of an image by the right light-guiding plate 26, and the right display unit 22 is provided on the right holding part 21 and is located near the right side head part of the user in the mounted state. The left display unit 24 is a unit related to image display by the left light-guiding plate 28, and the left display unit 24 is provided on the left holding part 23 and is located near the left side head part of the user in the mounted state. Note that, the right display unit 22 and the left display unit 24 may be collectively and simply referred to as a "display driving unit".

The right light-guiding plate 26 and the left light-guiding plate 28 are optical parts formed of a light transmissive resin or the like and are configured to guide imaging light output by the right display unit 22 and the left display unit 24 to the eyes of the user. The right light-guiding plate 26 and the left light-guiding plate 28 are, for example, prisms.

A dimmer plate may be provided on each of the surfaces of the right light-guiding plate 26 and the left light-guiding plate 28. The dimmer plate is an optical element being on a thin plate and having a different transmittance according to the wavelength range of light, and the dimmer plate functions as a so-called wavelength filter. The dimmer plate is, for example, disposed so as to cover a front side of the front frame 27, which is opposite the eyes of the user. By appropriately selecting optical properties of this dimmer plate, a transmittance of light in any wavelength range such as visible light, infrared light, and ultraviolet light can be adjusted, and the amount of light of outside light entering the right light-guiding plate 26 and the left light-guiding plate 28 from an outside and passing through the right light-guiding plate 26 and the left light-guiding plate 28 can be adjusted.

The HMD 100 is a see-through type display device, and the imaging light guided by the right light-guiding plate 26 and the outside light transmitted through the right light-guiding plate 26 are incident on the right eye of the user. Similarly, the imaging light guided by the left light-guiding plate 28 and the outside light transmitted through the left light-guiding plate 28 are incident on the left eye. As described above, the HMD 100 allows the imaging light corresponding to the image processed internally and the outside light to be incident on the eyes of the user in an overlapped manner, and the user can see an external scene through the right light-guiding plate 26 and the left light-guiding plate 28, and the user can visually recognize the image based on the imaging light overlapping on the external scene.

An illuminance sensor 65 is disposed on the front frame 27 of the image display unit 20. The illuminance sensor 65 receives the outside light from the front of the user wearing the image display unit 20.

A camera 61 is disposed on the front frame 27 of the image display unit 20. An imaging range and an imaging direction of the camera 61 will be described later. The camera 61 is provided at a position that the outside light passing through the right light-guiding plate 26 and the left light-guiding plate 28 is not blocked. In the example of FIG. 1, the camera 61 is disposed on a side of the end ER of the front frame 27, but the camera may also be disposed on a side of the end EL, or may be disposed at a coupling portion between the right light-guiding plate 26 and the left light-guiding plate 28.

A camera 61 is disposed on the front frame 27. The camera 61 is provided at a position that the outside light passing through the right light-guiding plate 26 and the left light-guiding plate 28 is not blocked. In the example of FIG. 1, the camera 61 is disposed on a side of the end ER of the front frame 27, but the camera may also be disposed on a side of the end EL or may be disposed at a coupling portion between the right light-guiding plate 26 and the left light-guiding plate 28.

The camera 61 is a digital camera including an imaging element such as a CCD and a CMOS, an imaging lens, and the like, and the camera 61 according to the present exemplary embodiment is a monocular camera but may be configured by a stereo camera. The camera 61 captures at least a part of an external scene in a visual field direction of the user in a state where the HMD 100 is mounted, and an angle of view of the camera 61 faces in a front direction of the user and overlaps on the external scene visually recognized by the user through the image display unit 20. The external scene is the external real space perceived by the user with the naked eye. The angle of view of the camera 61 can be appropriately set.

A Light Emitting Diode (LED) indicator 67 is disposed on the front frame 27. The LED indicator 67 is disposed adjacent to the camera 61 at the end ER and is configured to light up while the camera 61 is operating to notify that the capturing is in progress.

A distance sensor 64 is provided on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light such that the light emitted by the light source is reflected by the target object to be measured, for example. Further, the distance sensor 64 may be an ultrasonic wave type distance sensor including a sound source, configured to generate ultrasonic waves, and a detector, configured to receive the ultrasonic waves reflected by the target object to be measured. Further, the distance sensor 64 may use a laser range scanner, and, in this case, measuring a region with respect to a wide region including the front of the image display unit 20 can be performed.

Each of the right display unit 22 and the left display unit 24 of the image display unit 20 is connected to the connection device 10. In the HMD 100, the display unit connection cable 40 is connected to the left holding part 23, and wiring connected to the display unit connection cable 40 is laid inside the image display unit 20 to connect each of the right display unit 22 and the left display unit 24 to the connection device 10.

The connection cable 40 includes an audio connector 36, wherein a headset 30, including a right earphone 32 and a left earphone 34 constituting a stereo headphone and a microphone 63, is connected to the audio connector 36. The right earphone 32 is mounted on the right ear of the user, and the left earphone 34 is mounted on the left ear of the user. The right earphone 32 and the left earphone 34 can also be referred to as a sound output unit.

The right earphone 32 and the left earphone 34 output a sound based on a sound signal output from the connection device 10.

The microphone 63 is configured to collect a sound and to output the sound signal to the connection device 10. The microphone 63 may be a monaural microphone or a stereo microphone, for example, or may be a directional microphone or a non-directional microphone.

The connection device 10 includes a power button 12, brightness adjusting buttons 13, 14, and sound volume adjusting buttons 15, 16 as operated parts to be operated by the user. These operated parts are disposed on the surface of the main body of the connection device 10, for example, and may be operated by fingers of the user.

The power button 12 is a button configured to instruct turning on/off the power of the HMD 100. The brightness adjusting buttons 13 and 14 are buttons configured to adjust display brightness of the image displayed by the image display unit 20. The brightness adjusting button 13 is configured to instruct an increase in brightness, and the brightness adjusting button 14 is configured to instruct a reduction in brightness. The volume adjusting buttons 15, 16 are buttons configured to adjust volume of the sound output from the right earphone 32 and the left earphone 34. The volume adjusting button 15 is configured to instruct an increase in volume, and the sound volume adjusting button 16 is configured to instruct a reduction in volume.

Further, the connection device 10 includes an indicator 17 configured to display an operation state of the HMD 100. The indicator 17 includes an LED, for example, and lights up in red in a case where the power of the HMD 100 is on. Here, the LED is an abbreviation for Light Emitting Diode. Additionally, the indicator 17 lights up in white in a case of receiving an operation on the operated parts to be operated described above.

1-2. Control System of Display System

Figure 2:
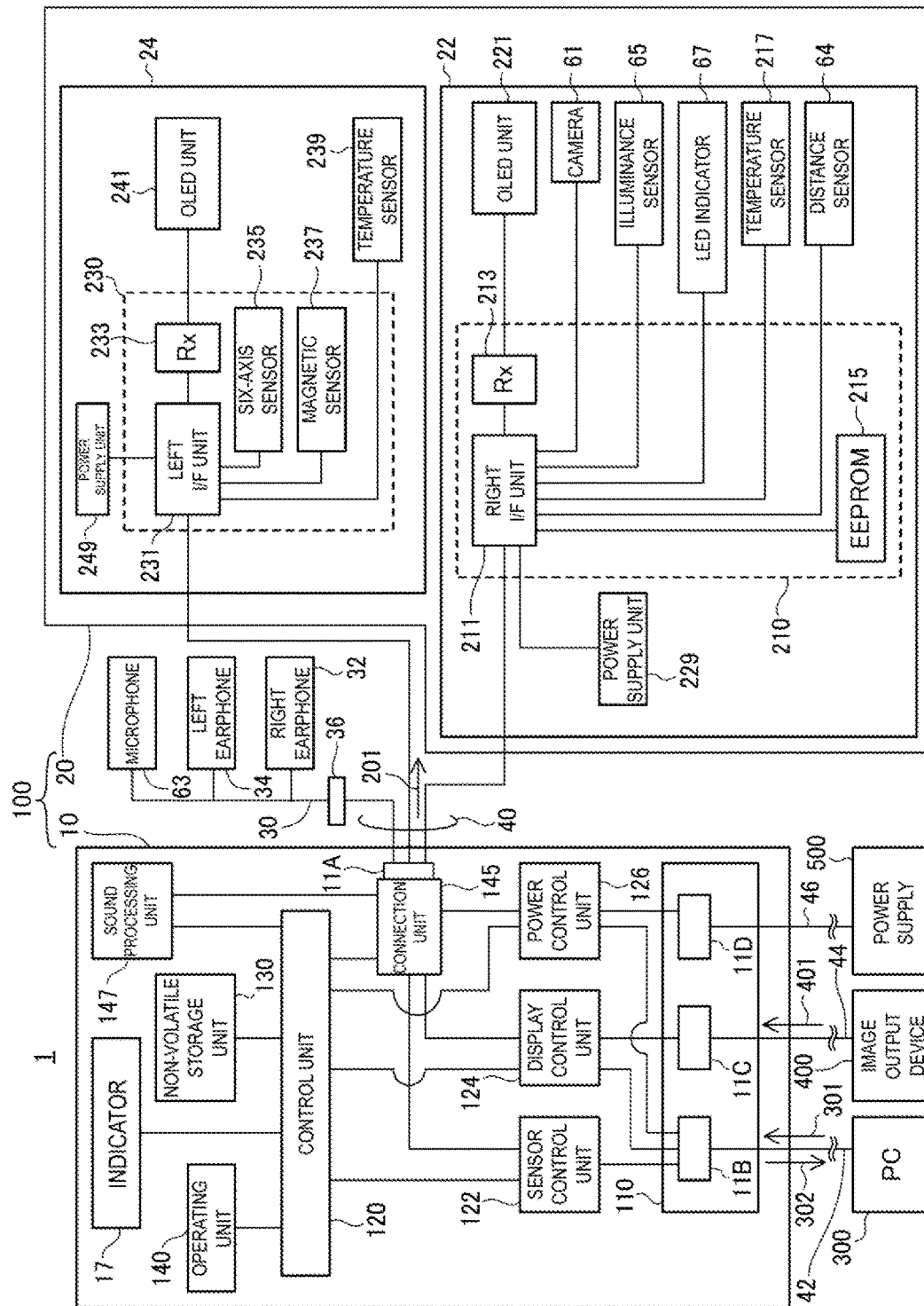
FIG. 2 is a block diagram of the display system.

FIG. 2 is a block diagram of the display system 1, illustrating the configuration of the HMD 100 in detail.

The right display unit 22 of the image display unit 20 includes a right display unit substrate 210. On the right display unit substrate 210, a right I/F unit 211 connected to the display unit connection cable 40, a receiving unit 213 that receives data input from the connection device 10 via the right I/F unit 211, and an EEPROM 215 are mounted. The right I/F unit 211 connects the receiving unit 213, the EEPROM 215, a temperature sensor 217, the camera 61, the distance sensor 64, the illuminance sensor 65, and the LED indicator 67 to the connection device 10. The receiving unit 213 connects an OLED unit 221 to the connection device 10.

The left display unit 24 includes a left display unit substrate 230. On the left display unit substrate 230, a left I/F unit 231 connected to the display unit connection cable 40, a receiving unit 233 that receives data input from the connection device 10 via the left I/F unit 231 are mounted. Further, the left display unit substrate 230 is mounted with a six-axis sensor 235 and a magnetic sensor 237.

The left I/F unit 231 connects the receiving unit 233, the six-axis sensor 235, the magnetic sensor 237, and the temperature sensor 239 to the connection device 10. The receiving unit 233 connects an OLED unit 241 to the connection device 10.

I/F is an abbreviation for interface. EEPROM is an abbreviation for Electrically Erasable Programmable Read-Only Memory. OLED is an abbreviation for Organic Light Emitting Diode. In the following description, the receiving unit 213 and the receiving unit 233 will be referred to as Rx 213 and Rx 233, respectively.

The EEPROM 215 is configured to store various types of data in a non-volatile manner. The EEPROM 215 stores, for example, data regarding light-emitting properties and display properties of the OLED units 221 and 241 included in the image display unit 20, data regarding properties of a sensor included in the right display unit 22 or the left display unit 24, and the like. Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100 and are written into the EEPROM 215. The data stored in the EEPROM 215 can be read by a control unit 120.

The camera 61 is configured to execute imaging in accordance with a signal input via the right I/F unit 211 and configured to output captured image data to the right I/F unit 211. The illuminance sensor 65 is configured to receive the outside light and to output a detection value corresponding to an amount of the received light or an intensity of the received light. The LED indicator 67 is configured to light up in accordance with a control signal or a driving current input via the right I/F unit 211.

The temperature sensor 217 is configured to detect a temperature of the OLED unit 221 and to output a voltage value or a resistance value corresponding to the detected temperature as a detection value.

The distance sensor 64 is configured to execute distance detection and to output a signal indicating detection results to the connection device 10 via the right I/F unit 211. As the distance sensor 64, for example, an infrared ray type depth sensor, an ultrasonic type distance sensor, a Time Of Flight distance sensor, a distance detecting unit configured to combine image detection and sound detection, or the like can be used. Additionally, the distance sensor 64 may be configured to process an image obtained by stereo photographing by a stereo camera or a monocular camera to detect a distance.

The receiving unit 213 is configured to receive image data for displaying transmitted from the connection device 10 via the right I/F unit 211 and to output the image data to the OLED unit 221. The OLED unit 221 is configured to display an image based on the image data transmitted by the connection device 10.

Further, the receiving unit 233 is configured to receive image data for displaying transmitted from the connection device 10 via the left I/F unit 231 and configured to output the image data to the OLED unit 241. The OLED units 221 and 241 are configured to display image based on the image data transmitted by the connection device 10.

The six-axis sensor 235 is a motion sensor including a three-axis acceleration sensor and a three-axis gyro sensor. The six-axis sensor 235 may adopt an IMU in which the sensors described above are provided as modules. The magnetic sensor 237 is a three-axis geomagnetic sensor, for example. A gyro sensor is also referred to as an angular velocity sensor. A motion sensor may be paraphrased as a completed sensor. IMU is an abbreviation for Inertial Measurement Unit.

The temperature sensor 239 is configured to detect a temperature of the OLED unit 241 and to output a voltage value or a resistance value corresponding to the detected temperature as a detection value.

Each part of the image display unit 20 operates with electric power supplied from the connection device 10 via the display unit connection cable 40.

The image display unit 20 includes a power supply unit 229 in the right display unit 22 and includes a power supply unit 249 in the left display unit 24. The power supply unit 229 is configured to distribute and supply the power supplied by the connection device 10 via the display unit connection cable 40 to each part of the right display unit 22 including the right display unit substrate 210. Similarly, the power supply unit 249 is configured to distribute and supply the power supplied by the connection device 10 via the display unit connection cable 40 to each part of the left display unit 24 including the left display unit substrate 230. The right display unit 22 and the left display unit 24 may include a conversion circuit or the like configured to convert a voltage.

The connection device 10 includes an I/F unit 110, the control unit 120, a sensor control unit 122, a display control unit 124, a power control unit 126, a non-volatile storage unit 130, an operating unit 140, a connection unit 145, and a sound processing unit 147.

The I/F unit 110 includes the connectors 11B, 11C and 11D. Further, the I/F unit 110 includes interface circuits connected to the connectors 11B, 11C, and 11D and configured to execute communication protocols conforming to respective communication standards.

The I/F unit 110 may be, for example, an interface substrate on which the connectors 11B, 11C, and 11D, and the interface circuit are mounted. Further, a configuration may be adopted in which the control unit 120, the sensor control unit 122, the display control unit 124, and the power control unit 126 of the connection device 10 are mounted on a connection device main substrate (not illustrated). In this case, on the connection device main substrate, the connectors 11B, 11C, and 11D of the I/F unit 110 and the interface circuit may be mounted.

Additionally, the I/F unit 110 may include, for example, an interface for a memory card capable of being connected to an external storage medium or the like, or the I/F unit 110 may be configured by a wireless communication interface.

The control unit 120 is configured to control each part of the connecting device 10. The control unit 120 executes a program by a processor 150 (FIG. 3) to be described later and controls each part of the HMD 100 in cooperation of software and hardware. The control unit 120 is connected to the non-volatile storage unit 130, the operating unit 140, the connection unit 145, and the sound processing unit 147.

The sensor control unit 122 is configured to control the camera 61, the distance sensor 64, the illuminance sensor 65, the temperature sensor 217, the six-axis sensor 235, the magnetic sensor 237, and the temperature sensor 239. Specifically, the sensor control unit 122 is configured to perform setting and initialization of a sampling period of each sensor according to control of the control unit 120 and configured to execute energization to each sensor, transmission of control data, acquisition of detection values, and the like, in correspondence to the sampling period of each sensor.

At least a part of each sensor that the sensor control unit 122 acquires the detection value and the camera 61 corresponds to the input device of the present disclosure. The input device can be selected from the distance sensor 64, the illuminance sensor 65, the temperature sensor 217, the six-axis sensor 235, the magnetic sensor 237, and the temperature sensor 239. In this case, the sensor data 302 include data regarding a detection value of one of the distance sensor 64, the illuminance sensor 65, the temperature sensor 217, the six-axis sensor 235, the magnetic sensor 237, and the temperature sensor 239. Further, the camera 61 may be an input device, and the captured image data of the camera 61 may be included in the sensor data 302 output as the data regarding the input device.

The sensor control unit 122 is connected to the connector 11B of the I/F unit 110, and is configured to output the data regarding the detection value acquired from each sensor to the connector 11B at a preset timing. The device connected to the connector 11B can acquire the detection value of each sensor of the HMD 100 and the captured image data of the camera 61. In the present exemplary embodiment, the detection value of each sensor and the captured image data of the camera 61 are output to the PC 300 by the sensor control unit 122. The data output by the sensor control unit 122 may be digital data including the detection value. Further, the sensor control unit 122 may be configured to output data of results obtained by an arithmetic operation based on the detection value of each sensor. For example, the sensor control unit 122 is configured to integrally process detection values of a plurality of sensors and to function as a so-called sensor fusion processing unit. By executing the sensor fusion, the sensor control unit 122 outputs data obtained from the detection values of the sensors, for example, track data of movement of the image display unit 20, relative coordinate data of the image display unit 20, and the like. The sensor control unit 122 may have a function of transmitting/receiving various kinds of control data relating to transmission of data to/from a device connected to the connector 11B.

In the configuration of FIG. 2, the sensor control unit 122 is configured to output the sensor data 302 from the connector 11B to the PC 300. The sensor data 302 include a detection value of each sensor provided in the image display unit 20 and/or captured image data of the camera 61.

The display control unit 124 is configured to execute various kinds of processing for the image display unit 20 to display an image based on image data; or image data input to the I/F unit 110. In the configuration of FIG. 2, the image signal 301 output by the PC 300 is input to the connector 11B, and the image signal 401 output by the image output device 400 is input to the connector 11C. The image signals 301 and 401 are digital image data but may be analog image signals. For example, the display control unit 124 is configured to execute various kinds of processing such as cutting out of a frame, resolution conversion, intermediate frame generation, and frame rate conversion. Resolution conversion includes so-called scaling. The display control unit 124 is configured to output image data corresponding to each of the OLED unit 221 and the OLED unit 241 to the connection unit 145. The image data input to the connection unit 145 are transmitted from the connector 11A to the right I/F unit 211 and the left I/F unit 231 as an image signal 201.

The image signal 201 is digital image data processed corresponding to each of the OLED unit 221 and the OLED unit 241.

For example, in a case where the image data input to the I/F unit 110 are 3D image data, the display control unit 124 is configured to execute 3D image decoding. The 3D image includes stereoscopic image in a broad sense. In processing of the 3D image decoding, the display control unit 124 is configured to generate a frame for the right eye and a frame for the left eye from the 3D image data. Formats of the 3D image data input to the I/F unit 110, for example, include a side by side format, a top and bottom format, and a frame packing format and the like, but 3D model data may be used.

The display control unit 124 is connected to the connector 11B and the connector 11C. The display control unit 124 is configured to execute processing on image data input to the connector 11B and image data input to the connector 11C as targets to be processed. Further, the display control unit 124 may have a function of transmitting/receiving various kinds of control data regarding transmission of image data to/from a device connected to the connector 11B or the connector 11C.

In the present exemplary embodiment, the connector 11B is configured by a USB-Type C connector. The display control unit 124 is configured to receive the image data transmitted in the alternative mode of the USB-Type C via the connector 11B. The connector 11C is, for example, an HDMI interface, and the display control unit 124 is configured to receive the image data in the HDMI standard input to the connector 11C.

Here, a device that outputs an image signal to be displayed by the image display unit 20 to the connection device 10; or an image signal to be displayed by the image display unit 20 is referred to as an image source. For example, in a case of outputting the image signal 401 output by the image output device 400 as the image signal 201, the image output device 400 or the image signal 401 is referred to as an image source. In the present exemplary embodiment, the device is used as the image source.

In a case where a plurality of the image signals are input from a plurality of devices to the I/F unit 110, the display control unit 124 outputs the image signal input from the image source selected by the control unit 120 to the image display unit 20. In the present exemplary embodiment, in a case where the image signal 301 from the PC 300 and the image signal 401 from the image output device 400 are input to the display control unit 124, the control unit 120 selects the PC 300 or the image output device 400 as the image source. The display control unit 124 is configured to process the image signal input from the image source selected by the control unit 120 in the image signals 301 and 401 and configured to output the image signal as the image signal 201 from the connection unit 145. The display control unit 124 is configured of the output unit of the present disclosure alone or together with the connection unit 145. The image signal 201 is a signal obtained by processing the image signal 301 or the image signal 401 with the display control unit 124, but the image signal 201 is also an image signal for displaying an image of the image signal 301 or the image signal 401. Therefore, it can be said that the image signal 201 is a signal selected by the display control unit 124 from the image signal 301 and the image signal 401.

The sensor control unit 122 and/or the display control unit 124 may be realized by cooperation of software and hardware by a processor executing a program. That is, the sensor control unit 122 and the display control unit 124 are configured by a processor to execute a program to execute the operations described above. In this example, the sensor control unit 122 and the display control unit 124 may be realized by a processor constituting the control unit 120 executing a program. In other words, the processor may function as the control unit 120, the display control unit 124, and the sensor control unit 122 by executing the program. Here, the processor can be paraphrased as a computer.

Further, the display control unit 124 and the sensor control unit 122 may include programmed hardware such as DSP or FPGA. Further, the sensor control unit 122 and the display control unit 124 may be integrated to be configured of an SoC-FPGA. DSP is an abbreviation for Digital Signal Processor, FPGA is an abbreviation for Field Programmable Gate Array, and SoC is an abbreviation for System-on-a-Chip.

The power control unit 126 is coupled to the connector 11C and the connector 11D. The power control unit 126 is configured to supply power to each part of the connection device 10 and the image display unit 20 based on the power supplied from the connectors 11C and 11D. Further, the power control unit 126 may be configured to include a voltage conversion circuit (not illustrated) to convert the voltage, and to supply the voltage to each part of the connection device 10 and the image display unit 20. The power control unit 126 may be configured of a programmed semiconductor device such as a logic circuit and the FPGA. Further, the power control unit 126 may be configured of hardware common to the sensor control unit 122 and/or the display control unit 124.

Each of the sensor control unit 122, the display control unit 124, and the power control unit 126 may include a work memory for executing data processing and may execute processing by using the memory 160 (FIG. 3) of the control unit 120.

The operating unit 140 is configured to detect an operation on an operated part included in the connection device 10 and to output data indicating an operation content or an operation signal indicating the part to be operated to the control unit 120.

The sound processing unit 147 is configured to generate a sound signal according to sound data that is input from the control unit 120 and configured to output the sound signal to the connection unit 145. This sound signal is output from the connection unit 145 to the right earphone 32 and the left earphone 34 via the audio connector 36. Additionally, the sound processing unit 147 is configured to adjust the volume of the sound signal under the control of the control unit 120. Additionally, the sound processing unit 147 is configured to generate sound data of the sound collected by the microphone 63 and configured to output the sound data to the control unit 120. This sound data may be processed by the control unit 120 in the same manner as the detection value of the sensor included in the image display unit 20.

Additionally, the connection device 10 may be configured to include a battery not illustrated and to supply power from the battery to each part of the connection device 10 and the image display unit 20. The battery included the connection device 10 may be a rechargeable secondary battery.

Figure 3:
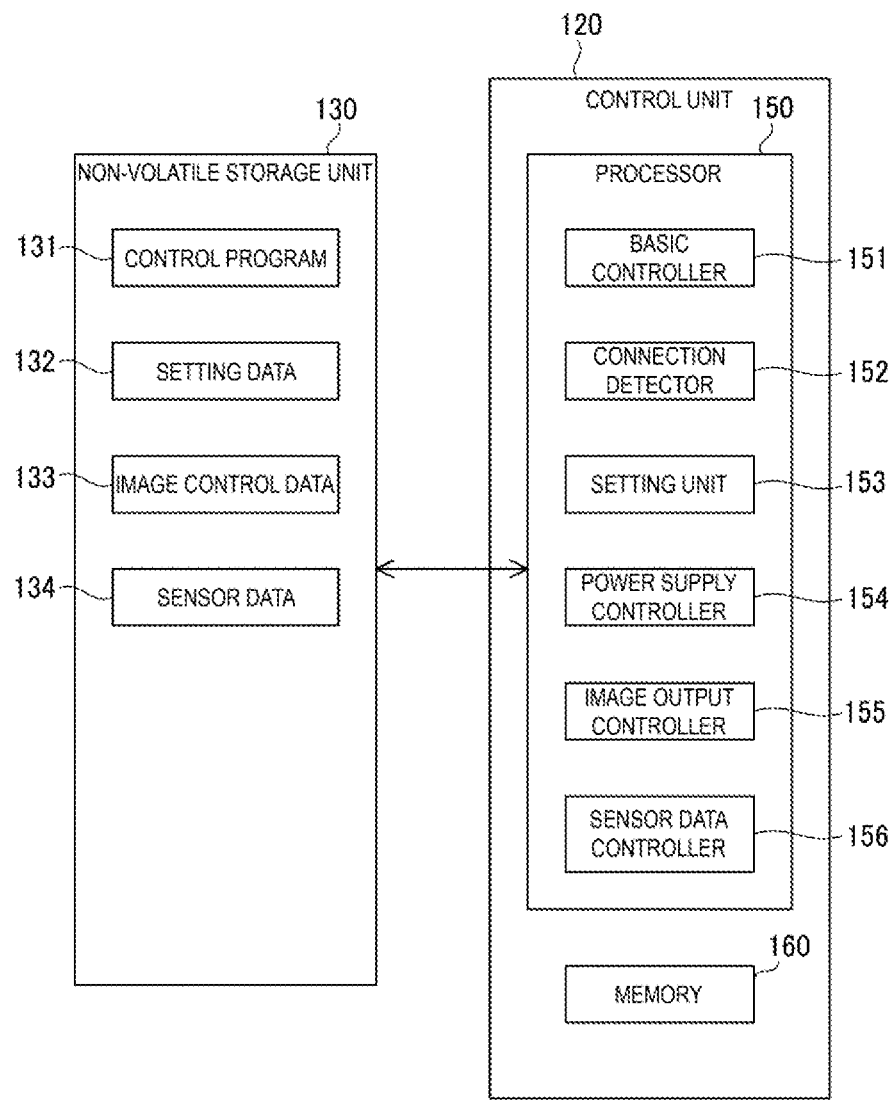
FIG. 3 is a functional block diagram of a control system of an HMD.

FIG. 3 is a functional block diagram of a control system of the HMD 100, and illustrates functional configurations of the control unit 120 and the non-volatile storage unit 130 in detail.

The control unit 120 includes a processor 150 and a memory 160. The processor 150 is configured of a CPU, a microcomputer, and the like and executes a program to control each part of the HMD 100 in cooperation of software and hardware. The processor 150 may be programmed hardware such as DSP or FPGA.

The memory 160 is configured of a RAM for forming a work area of the processor 150, a ROM for storing a control program, and the like. Further, the control unit 120 may be a semiconductor device integrating the processor 150 and the memory 160. CPU is an abbreviation for Central Processing Unit, RAM is an abbreviation for Random Access Memory, and ROM is an abbreviation for Read Only Memory.

The non-volatile storage unit 130 is a storage device configured to store data to be processed by the control unit 120 and the like in a non-volatile manner. The non-volatile storage unit 130 is, for example, a magnetic recording device such as an HDD or is a storage device using a semiconductor storage element such as a flash memory. HDD is an abbreviation for Hard Disk Drive.

The non-volatile storage unit 130 stores a control program 131 to be executed by the processor 150. Additionally, the non-volatile storage unit 130 stores setting data 132, image control data 133, and sensor data 134 as data to be processed by the processor 150. The image control data 133 correspond to the display condition of the present disclosure, and the non-volatile storage unit 130 corresponds to the storage unit.

By executing the program, the processor 150 is configured by a basic controller 151, a connection detector 152, a setting unit 153, a power supply controller 154, an image output controller 155, and a sensor data controller 156.

The basic controller 151 is a control unit configured to control each part of the HMD 100 and executes a function of a so-called operating system. Further, the basic controller 151 may execute a function of application program operating on the operating system. The configuration in which the control unit 120 executes the operating system is merely one aspect, and applying the present disclosure to a configuration is certainly capable in which the processor 150 is programmed hardware and does not use an operating system.

The basic controller 151 is configured to determine the operation content detected by the operating unit 140. Further, the basic controller 151 outputs the sound data to the sound processing unit 147 and causes to output the sound signal based on the sound data to the right earphone 32 and the left earphone 34. Additionally, the basic controller 151 is configured to adjust the volume of the sound signal output from the sound processing unit 147 based on the operation detected by the operating unit 140.

The basic controller 151 is configured to control start and stop of powering the LED indicator 67. For example, the basic controller 151 lights up or blinks the LED indicator 67 in correspondence to timing at which the camera 61 starts and ends imaging.

The connection detector 152 is configured to control the sensor control unit 122, the display control unit 124, the power control unit 126, and the connection unit 145, and configured to detect the connection states of the connectors 11A, 11B, 11C, and 11D. The connection detector 152 is configured to determine whether the image display unit 20 is connected to the connector 11A. Additionally, the connection detector 152 is configured to determine whether there is a connection of an external device to the connectors 11B, 11C, and 11D and configured to perform a determination of the connected external device. The connection detector 152 is configured to control the sensor control unit 122, the display control unit 124, and the power control unit 126 such that the sensor control unit 122, the display control unit 124, and the power control unit 126 execute operations appropriate for each device connected via the I/F unit 110. The connection detector 152 corresponds to the detecting unit of the present disclosure.

In the present exemplary embodiment, a configuration in which the I/F unit 110 includes the connectors 11A, 11B, 11C, and 11D to be wired is illustrated. In this configuration, the connection detector 152 may be configured to detect that the cables compatible with each of the connectors are connected to the connectors 11A, 11B, 11C, and 11D. Alternatively, the connection detector 152 may be configured to detect that the external device or the image display unit 20 is connected via a cable with respect to the connectors 11A, 11B, 11C, and 11D. Alternatively, the connection detector 152 may detect that image signal and power are being supplied from the external device via the cable regarding the connectors 11B, 11C, and 11D. Further, the connection detector 152 may distinguish and detect a state where the connectors 11A, 11B, 11C, and 11D are connected to the cable, a state where the external device or the connector 11A is connected via the cable, and a state where the image and power are supplied via the cable.

The setting unit 153 generates and updates the setting data 132 and the image control data 133 according to the operation of the operated part included in the connection device 10.

The power supply controller 154 is configured to control power supply from the power control unit 126 to each part of the connection device 10 and the connection unit 145. Specifically, in a case where the power control unit 126 receives power supply from the connector 11B or the connector 11D, the power supply controller 154 executes power supply to each part of the connection device 10 based on the supplied power, and the power supply controller 154 further executes power supply to the power supply units 229 and 249. Further, the power supply controller 154 is configured to monitor the power supply state to the power control unit 126 and to control the operation state of the connection device 10.

Further, the power supply controller 154 is configured to control an operation mode of the HMD 100. The operation mode of the HMD 100 includes at least a normal operation mode in which an image can be displayed and a power saving mode. The normal operation mode is an operation mode in which power is supplied to each part of the HMD 100, and each part can execute operations. In contrast, in the power saving mode, a power consumption of the HMD 100 is less than that in the normal operation mode.

The power supply controller 154 is configured to determine whether a preset condition regarding the operation of the image display unit 20 is satisfied based on an operation with respect to the operating unit 140 or a detection state of the sensor of the image display unit 20. In a case where the preset condition is satisfied, the power supply controller 154 executes the transition from the normal operation mode to the power saving mode; and the transition from the power saving mode to the normal operation mode.

For example, in the normal operation mode, the power supply controller 154 shifts to the power saving mode in a case where a state, in which there is no operation on the operating unit 140, and a state, in which the detection value of the sensor of the image display unit 20 is not greater than a preset threshold value, continue for a set time or more. Further, in the power saving mode, in a case where an operation with respect to the operating unit 140 is executed, the operation mode is shifted to the normal operation mode. Further, in the power saving mode, in a case where the detection value of the sensor of the image display unit 20 is greater than the preset threshold value, the operation mode is shifted to the normal operation mode.

In the power saving mode, the power of each part including the OLED units 221 and 241 is turned off, and a sampling frequency of the detection value of each sensor included in the image display unit 20 is set to be lower than the normal operation mode. Further, in the power saving mode, power supply to each part including the indicator 17 and the sound processing section 147 is stopped. In each of these parts, power is supplied in the normal operation mode, and the power is turned on.

The image output controller 155 is configured to read data from the EEPROM 215 and to set operations of the sensor control unit 122 and the display control unit 124 based on the read data. The image output controller 155 generates an image signal based on the image data received by the display control unit 124 and outputs the image signal to the connection unit 145. Further, in a case where the image data received by the display control unit 124 accompanies the sound data, the image output controller 155 outputs the sound data to the sound processing unit 147.

In a case where a plurality of external devices are connected to the connectors 11B and 11C provided in the I/F unit 110, the image output controller 155 switches the image to be displayed by the image display unit 20. The image output controller 155 selects one of the plurality of external devices connected to the connectors 11B and 11C as the image source and causes the image display unit 20 to display image based on the image data supplied by the selected external device. The image output controller 155 corresponds to an output control unit of the present disclosure.

The image output controller 155 switches the image source based on the operation detected by the operating unit 140 and based on the detection value of the sensor of the image display unit 20.

Further, in a case where the connection detector 152 of the image output controller 155 detects that a device that outputs an image signal is connected to the plurality of connectors 11 of the I/F unit 110 to which a plurality of image signals are input, the image output controller 155 selects one of the devices as the image source. Here, the image output controller 155 refers to the image control data 133 and sets the device designated by the image control data 133 as the image source.

Further, in a case where no image signal is input from an external device to the I/F unit 110, the image output controller 155 may generate a notification image and output an image signal based on the notification image from the connector 11A. Specifically, in a case where no external device is connected to the I/F unit 110 or no image signal is input from an external device connected to the I/F unit 110, the connection detector 152 output an image signal of the notification image indicating that there is no image. The notification image is a character string such as "No Signal", an image, or the like, for example, and is an image for notifying the user that there is no image signal. The image output controller 155 causes the image signal of the notification image to be output from the connection unit 145 based on the data of the notification image stored in the non-volatile storage unit 130 or the data generated by the image output controller 155.

The sensor data controller 156 is configured to control the output of data by the sensor control unit 122. The sensor data controller 156 causes the data of each sensor included in the image display unit 20 and captured image data of the camera 61 to be acquired by the sensor control unit 122. The sensor data controller 156 outputs data of each sensor included in the image display unit 20 and captured image data of the camera 61 via a connector connected to the sensor control unit 122 in the I/F unit 110. Further, in a case where the sensor control unit 122 receives control data for requesting data of the sensor from the external device, the sensor data controller 156 responds to the received request and controls the output of the sensor control unit 122.

In a case where the power of the HMD 100 is switched on by the operation of the power button 12 (FIG. 1) or in a case where the connection detector 152 detects the start of the power supply from the external device, the control unit 120 executes activation control of the HMD 100. The activation control of the HMD 100 is executed by the image output controller 155 based on the detection state of the connection detector 152.

The control program 131 stored in the non-volatile storage unit 130 is a program to be executed by the processor 150. The control program 131 corresponds to the functions of the basic controller 151, the connection detector 152, the setting unit 153, the power supply controller 154, the image output controller 155, and the sensor data controller 156.

The setting data 132 are data including various setting contents regarding the operation of the HMD 100. The image control data 133 include information for designating a device to be selected as the image source in a case where a plurality of image signals are input from a plurality of devices to the connection device 10. This information may be information designating a device connected to the I/F unit 110. Specifically, the information may be information indicating the types of the PC 300 and the image output device 400, information for identifying an individual of the PC 300 and the image output device 400, or information for identifying the connectors 11B and 11C of the I/F unit 110. The information indicating the types of the PC 300 and the image output device 400 is a model name, vendor identification information, device name, and the like. The information for identifying the PC 300 and the image output device 400 is a serial number, a device ID, and the like.

The image control data 133 are set by the setting unit 153. The setting unit 153 sets default information, that is, information as an initial value, as the information for designating a device to be selected as the image source. The initial value of the image control data 133 designates, as an image source, a device connected to the connector 11C, which is a connector for an image signal, among a plurality of devices connected to the connector 11 that inputs the image signal to the connection device 10. That is, the I/F unit 110 includes a connector 11C as a first connection unit to which an image signal is input and includes a connector 11B as a second connection unit capable of inputting an image signal and outputting sensor data. The setting unit 153 sets a connector 11C provided as an interface for the image signal as a connector to be prioritized in selecting the image source. Then, the image control data 133 designate the connector 11B capable of inputting the image signal and outputting the sensor data as an image source having a lower priority than the connector 11C. In other words, the image control data 133 may be information for designating priority or priority ranks to be selected as image sources for a plurality of connectors 11.

Further, when the image signal 201 is output to the image display unit 20 to display the image, the setting unit 153 counts the time of displaying the image signal on the image display unit 20 for each device as the image source. The setting unit 153 is configured to update the image control data 133 based on the count value.

Specifically, in association with the PC 300, the setting unit 153 counts the time, as the image signal 201, that the image signal 301 that is input from the PC 300 is output. Additionally, in association with the image output device 400, the setting unit 153 counts the time, as the image signal 201, that the image signal 401 that is input from the image output device 400 is output. The setting unit 153 sets the priority to be selected as the image source in the image control data 133 and updates the image control data 133 such that, for the device in which a cumulative value of the counted time is greater, the priority becomes higher among the PC 300 and the image output device 400.

The time counted by the setting unit 153 is referred to as an image output time. The image output time corresponds to an output time of the present disclosure.

The time counted by the setting unit 153 can be, for example, a real time. That is, in the present exemplary embodiment, the setting unit 153 counts the image output time, for example, in seconds, based on the time measured by a Real Time Clock (RTC) of the processor 150. The RTC can output time data and time code. The setting unit 153 acquires the time data and the time code output by the RTC and counts the real time in seconds.

Further, the time counted by the setting unit 153 may be a count value other than the real time, such as a number of loops of processing executed by the control unit 120 as described later.

The setting unit 153 may count the image output time in association with the connector 11. In this case, the setting unit 153 counts the image output time with the connector 11B as the image source and counts the image output time with the connector 11C as the image source, respectively. In this case, the setting unit 153 sets the priority to be selected as the image source in the image control data 133 and updates the image control data 133 such that, for the device wherein the image output time is long, the priority is high in the connectors 11B and 11C.

Further, the setting unit 153 may count the image output time for each type of the PC 300 or the image output device 400, or the setting unit 153 may count the image output time for each individual of the PC 300 and the image output device 400. In this case, the setting unit 153 sets the priority to be selected as the image source in the image control data 133 and updates the image control data 133 such that, for an individual wherein the image output time is long, the priority is higher among the individual devices detected by the connection detector 152.

For each connector 11 counted by the setting unit 153, for each type of the PC 300 and the image output device 400 or for each individual of the PC 300 and the image output device 400, the image output time may be reset each time when the power of the HMD 100 is turned off and turned on. In this case, each time the power of the HMD 100 is turned on, the image output controller 155 selects the image source according to the initial value of the image control data 133. Additionally, the image output time may be continuously counted even when the power of the HMD 100 is turned on or off.

The image control data 133 may include information indicating the image output time counted by the setting unit 153. In this case, for each of the connector 11, for each type of the PC 300 and the image output device 400, or for each individual of the PC 300 and the image output device 400, the setting unit 153 records the image output time in the image control data 133 every time counting is performed or at a predetermined timing.

The sensor data 134 includes detected values acquired from the sensors provided in the image display unit 20 by the sensor data controller 156 and captured image data of the camera 61. The sensor data controller 156 temporarily stores the detection value of the sensor and the captured image data as the sensor data 134 and outputs those as the sensor data 302 by the sensor control unit 122. The sensor data 134 may include the sound data of the sound collected by the microphone 63.

Figure 4:
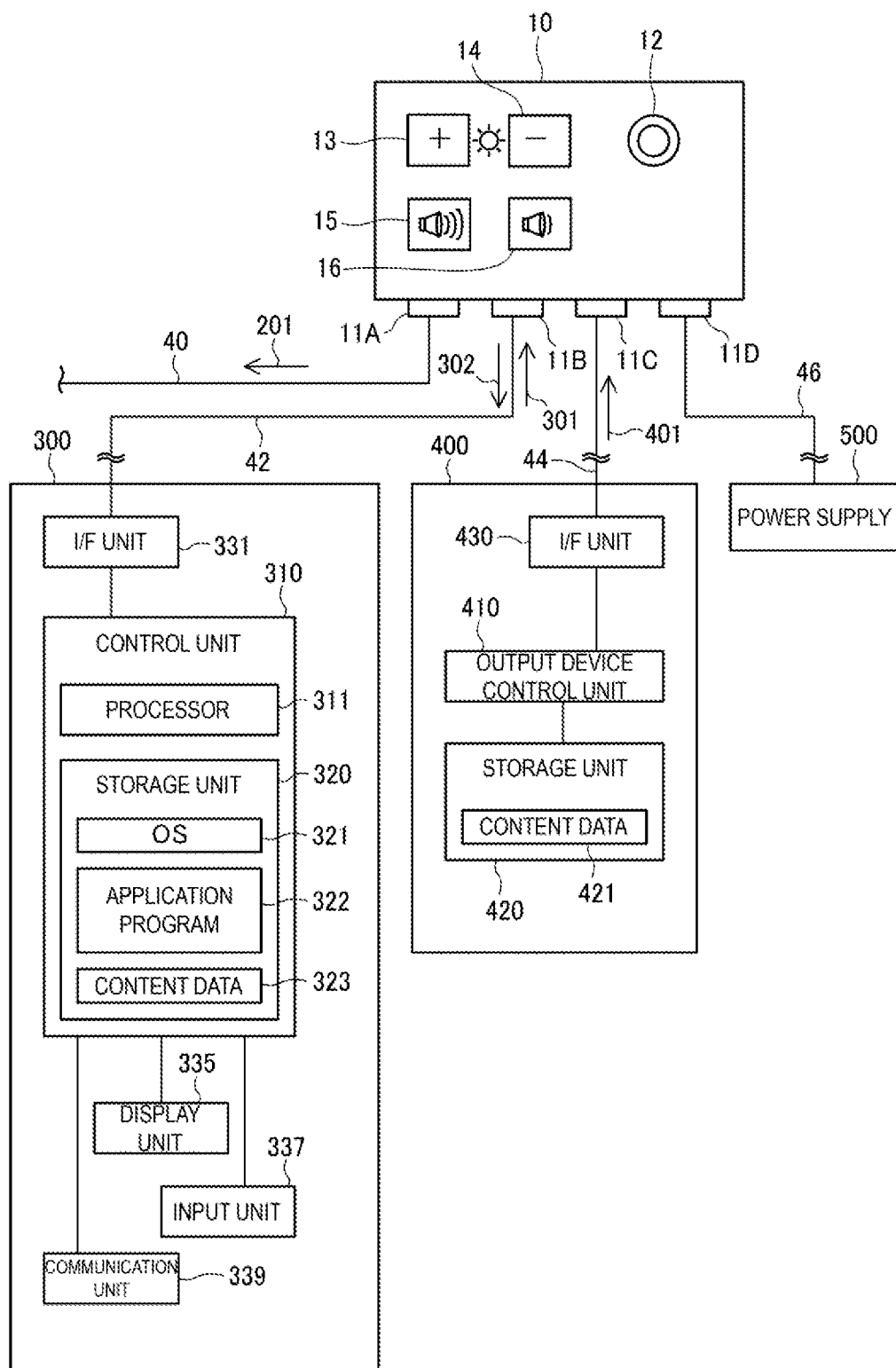
FIG. 4 is a block diagram of a device connected to the HMD.

FIG. 4 is a block diagram of a device connected to the HMD 100.

The PC 300 includes a control unit 310, a storage unit 320, an I/F unit 331, a display unit 335, an input unit 337, and a communication unit 339.

The control unit 310 includes a processor 311 and a storage unit 320. The processor 311 is configured by a CPU, a microcomputer, and the like and is configured to execute a program to control each part of the PC 300 in cooperation of software and hardware. The processor 311 may be a programmed hardware such as DSP or FPGA.

The storage unit 320 is configured of a RAM that forms a work area of the processor 311, a ROM that stores a control program, and the like. Further, the control unit 310 may be a semiconductor device integrating the processor 311 and the storage unit 320. Further, the storage unit 320 may be a magnetic recording device such as an HDD or a non-volatile storage device using a semiconductor storage element such as a flash memory.

The storage unit 320 stores an operating system 321 which is a program to be executed by the processor 311; and an application program 322. The operating system is expressed as OS in the figure. Further, the storage unit 320 stores content data 323.

The I/F unit 331 is an interface connected to an external device, and is connected to the connection device 10 via the first connection cable 42 in the present exemplary embodiment. The I/F unit 331 is configured to execute communication conforming to, for example, a standard such as an HDMI interface and a USB interface. The I/F unit 331 includes a connector to be connected to the first connection cable 42, an interface circuit configured to process a signal transmitted via the connector, and the like.

The display unit 335 includes a display screen such as a liquid crystal display panel, and the display unit 335 displays processing results and the like processed by the processor 311.

The input unit 337 detects an input by an input device such as a keyboard or a mouse; or an input by a touch sensor laid on the surface of the display unit 335.

The communication unit 339 is a communication interface configured to execute data communication with an external device. The communication unit 339 may be a wired communication interface capable of being connected to a cable or may be a wireless communication interface.

The processor 311 executes the operating system 321 and the application program 322 to control each part of the PC 300 and to reproduce the content data 323. The processor 311 outputs the image data and sound data included in the content data 323 to the connection device 10 by the I/F unit 331.

Further, the processor 311 mutually executes data communication with the connection device 10 via the first connection cable 42. The processor 311 is configured to request the captured image data of the camera 61 provided in the HMD 100; and the detection values of the distance sensor 64, the illuminance sensor 65, the six-axis sensor 235, the magnetic sensor 237, and the like, with respect to the connection device 10. For example, the processor 311 edits or generates image data to be output to the connection device 10 based on the captured image data and the detection value acquired from the connection device 10 by the function of the application program 322.

The image output device 400 includes an output device control unit 410, a storage unit 420, and an I/F unit 430. The output device control unit 410 includes a processor (not illustrated) and is configured to cause the processor to execute a program to control each part of the image output device 400 in cooperation of software and hardware. The processor of the output device control unit 410 may be a programmed hardware such as DSP or FPGA.

The storage unit 420 stores programs to be executed by the output device control unit 410 and data to be processed by the output device control unit 410. Further, the storage unit 420 stores content data 421. The I/F unit 430 is an interface connected to an external device by wired or wireless connection, and is connected to the connection device 10 via the second connection cable 44 in the present exemplary embodiment.

The output device control unit 410 reproduces the content data 421 stored in the storage unit 420 and outputs the image data and the sound data included in the content data 421 to the connection device 10 by the I/F unit 430.

The image output device 400 may be a device that reads and reproduces the content data 421 recorded on a portable recording medium such as a CD or DVD. Further, the image output device 400 may include a communication unit configured to execute data communication and may output image data and sound data received from an external server by the communication unit via the I/F unit 430.

1-3. Operation of Display System

Figure 5:
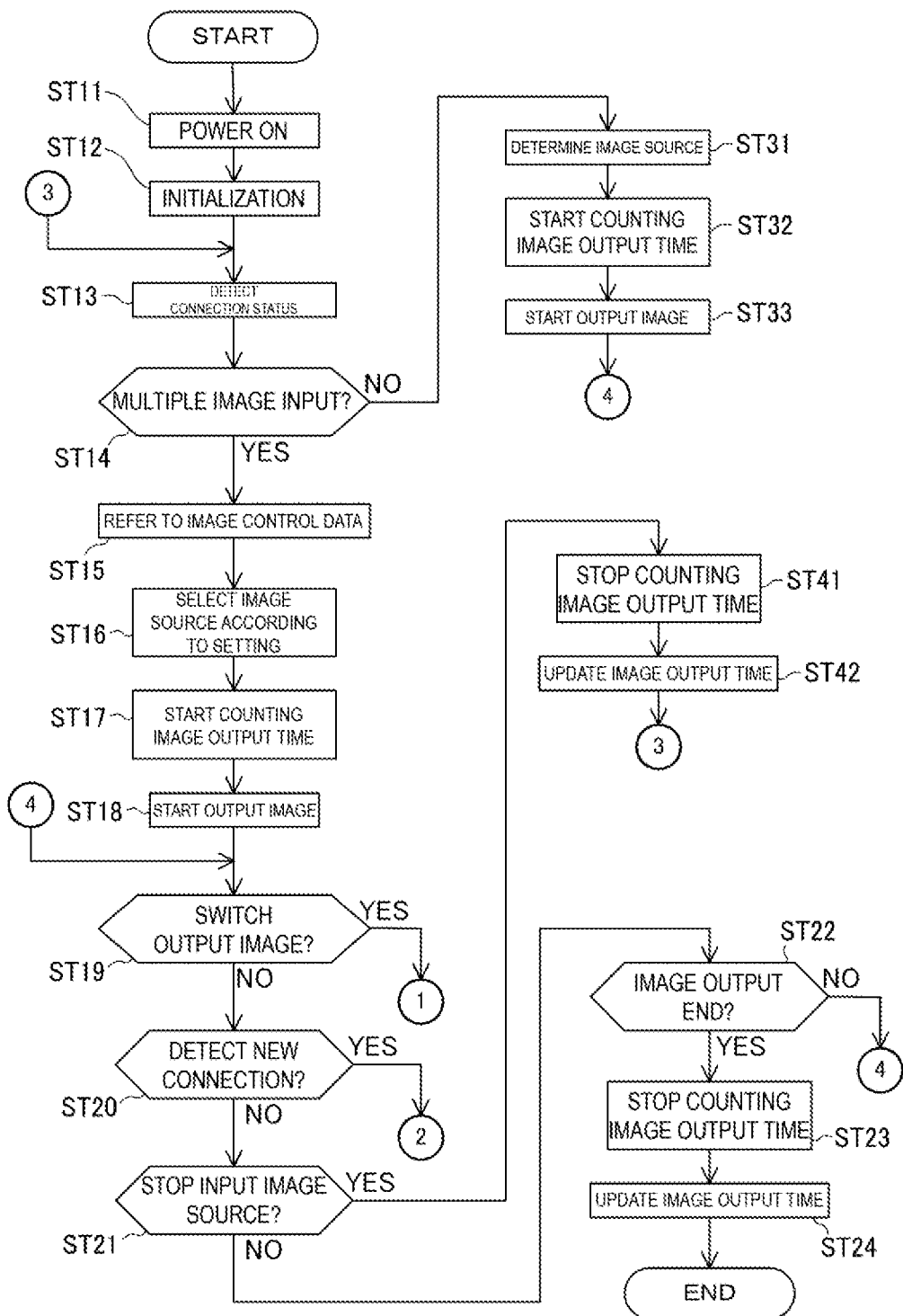
FIG. 5 is a flowchart illustrating operations of the HMD.
Figure 6:
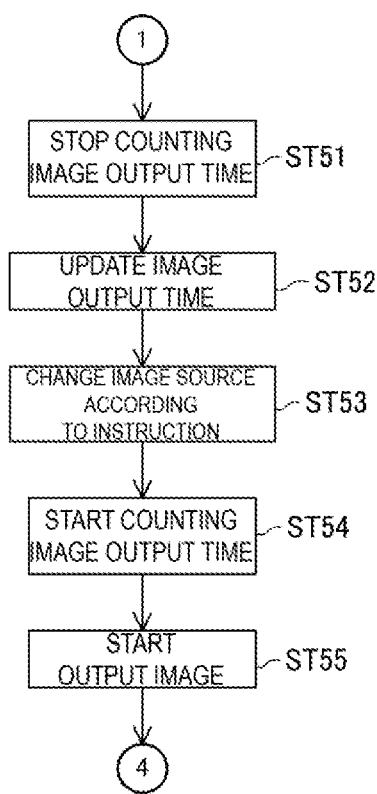
FIG. 6 is a flowchart illustrating operations of the HMD.
Figure 7:
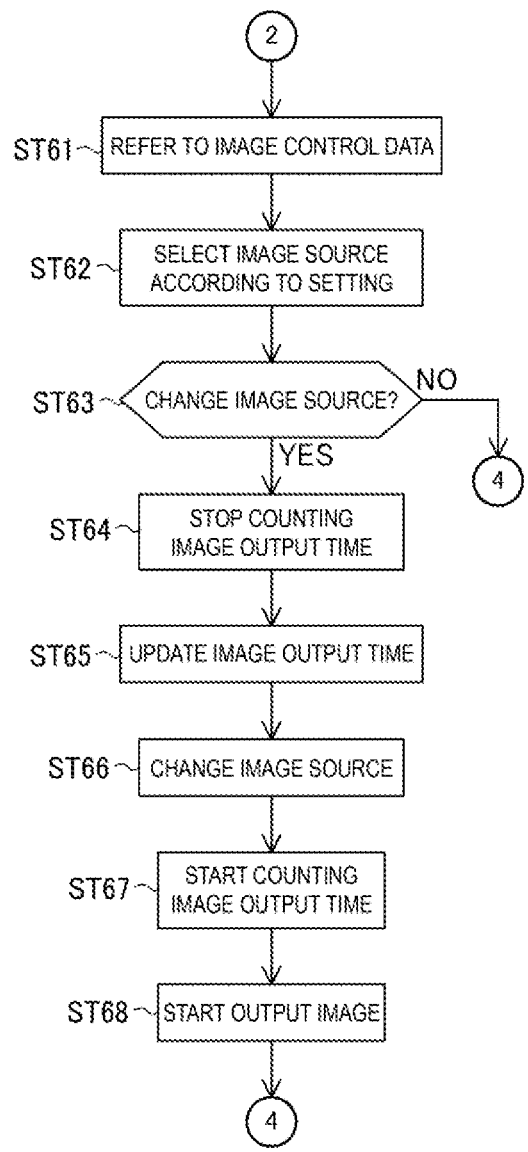
FIG. 7 is a flowchart illustrating operations of the HMD.

FIGS. 5, 6, and 7 are flowcharts illustrating operations of the HMD 100.

In the operations illustrated in FIGS. 5, 6, and 7, at least one of the PC 300, the image output device 400, and the power supply device 500 is connected to the HMD 100, and image data and power are supplied to the I/F unit 110.

The control unit 120 of the HMD 100 switches on the power of the HMD 100 and starts the activation control (step ST11) by detecting the operation to turn on the power of the HMD 100 or the start of power supply to the I/F unit 110.

The control unit 120 initializes each part of the HMD 100, and starts supplying power to each part of the connection device 10 (step ST12). The control unit 120 detects the connection status of the connector 11A and the connectors 11B, 11C, and 11D of the I/F unit 110 by the connection detector 152 (step ST13). In step ST13, the connection detector 152 detects the input state of the image signal to the connector 11 of the I/F unit 110. Although not illustrated, in a case where the image display unit 20 is not connected, the control unit 120 waits until the image display unit 20 is connected. Further, in a case where no external device other than the device for supplying power is connected to the I/F unit 110, the control unit 120 may wait until the external device is connected.

The control unit 120 determines whether a plurality of image signals are input to the I/F unit 110 (step ST14). In a case where the plurality of image signals are detected by the connection detector 152 (YES in step ST14), the control unit 120 refers to the image control data 133 (step ST15). The control unit 120 selects the image source designated by the image control data 133 (step ST16), and the control unit 120 starts counting the image output time in association with the image source which is selected (step ST17). The control unit 120 starts the operation of outputting the image signal of the image source selected in step ST16 from the connection unit 145 as the image signal 201 (step ST18).

In step ST17, the setting unit 153 starts real-time counting as described above. Specifically, the setting unit 153 counts an elapsed time since counting started in step ST17. In this case, the setting unit 153 sets the count value to zero at the time of starting counting in step ST17 and executes the counting in units of one second until counting is stopped. This also applies to the time of starting counting in steps ST32, ST54, and ST67 described later. In this case, the image output time counted by the setting unit 153 is a value indicating the length of time in seconds.

Further, in step ST17 and in steps ST32, ST54, and ST67 to be described later, the setting unit 153 may acquire the time of starting counting from the RTC in step ST17. In this case, the setting unit 153 acquires the time of stopping counting from the RTC when counting is stopped in the later-described steps ST23, ST41, and ST64. Then, the setting unit 153 stores the time of starting counting and the time of stopping counting in the non-volatile storage unit 130. In this case, the image output time counted by the setting unit 153 is a length of time required as a difference of the time of starting counting and the time of stopping counting.

Further, the setting unit 153 may count a number of times of executing the processes illustrated in FIGS. 5, 6 and 7. Specifically, the setting unit 153 may count the number of times of executing the process from starting counting in step ST17 to stopping counting. The process of stopping counting is the process of step ST23, step ST41, step ST51, or step ST64. For example, in a case of starting counting in step ST17 and stopping counting in step ST23 to be described later, the setting unit 153 increments the count value of the image source selected in step ST16 by one. Additionally, the same can be done in a case of starting counting in steps ST32, ST54, and ST67 to be described later. That is, the setting unit 153 increments the count value of the image output time by one when each time the start and stop of counting are executed for each image source.

The control unit 120 determines whether the operating unit 140 has detected an operation for instructing to switch the image source (step ST19). In a case where an operation instructing to switch the image source is not detected (step ST19; NO), the control unit 120 determines whether the connection detector 152 has detected that a new image signal has been input to the I/F unit 110 (Step ST20). In step ST20, it is determined whether the connection detector 152 has detected the connection of a device different from the device detected in step ST13 or whether the connection detector 152 has detected, after step ST13, the input of an image signal different from the image signal detected in step ST13.

In a case where no new connection is detected (step ST20; NO), the control unit 120 determines whether the input of the image signal from the selected image source is stopped (step ST21). In a case where the input of the image signal is not stopped (step ST21; NO), the control unit 120 determines whether there is an operation for instructing to end the output of the image by the image display unit 20 (step ST22). In a case where there is an operation for instructing to end the output of the image (step ST22; YES), the control unit 120 stops counting the image output time (step ST23). The control unit 120 updates the image control data 133 based on the counted image output time (step ST24), stops output of the image signal 201, and ends the processing.

Further, in a case where it is determined that the operation for instruct to end the output of the image is not executed (step ST22; NO), the control unit 120 returns to step ST19.

In a case where there are not a plurality of image signals detected by the connection detector 152 (step ST14; NO), the image signal input to the I/F unit 110 is single. In this case, the control unit 120 determines the device to which the image signal is input to be the image source (step ST31) and starts counting the image output time in association with the image source (step ST32). The control unit 120 starts the operation of outputting the image signal of the image source determined in step ST31 as the image signal 201 from the connection unit 145 (step ST33). Thereafter, the control unit 120 proceeds to step ST19.

In a case where the input of the image source is stopped (step ST21; YES), the control unit 120 stops counting the image output time (step ST41). The control unit 120 updates the image control data 133 based on the counted image output time (step ST42) and returns to step ST13.

Additionally, in a case where an operation for instructing to switch the image source is detected (step ST19; YES), the control unit 120 executes an operation of switching the image source. This operation is illustrated in detail in FIG. 6.

In FIG. 6, the control unit 120 stops counting the image output time (step ST51). The control unit 120 updates the image control data 133 based on the counted image output time (step ST52) and changes the image source according to the operation detected by the operating unit 140 (step ST53). The control unit 120 starts counting the image output time in association with the changed image source (step ST54) and starts the operation of outputting the image signal of the changed image source from the connection unit 145 as the image signal 201 (Step ST55). Thereafter, the control unit 120 proceeds to step ST19 of FIG. 5.

Further, in a case where a new connection is detected (step ST20; YES), the control unit 120 executes the selection of the image source again. This operation is illustrated in detail in FIG. 7.

In FIG. 7, the control unit 120 refers to the image control data 133 (step ST61). In accordance with the setting of the image control data 133, the control unit 120 selects an image source from all the devices including the device which is newly detected (step ST62). Here, the control unit 120 determines whether the image source has been changed (step ST63). That is, the control unit 120 determines whether the image source selected in step ST62 is a device different from the image source selected before step ST62.

In the case where the image source is not changed, that is, the image source selected in step ST62 is the same as the image source selected before step ST62 (step ST63; NO), the control unit 120 proceeds to step ST19 in FIG. 5.

In the case of changing the image source, that is, in a case where the image source selected in step ST62 is different from the image source selected before step ST62 (step ST63; YES), the control unit 120 stops counting the image output time (step ST64). The control unit 120 updates the image control data 133 based on the counted image output time (step ST65), and changes the image source in accordance with the selection in step ST62 (step ST66). The control unit 120 starts counting the image output time in association with the changed image source (step ST67) and starts the operation of outputting the image signal of the changed image source from the connection unit 145 as the image signal 201 (step ST68). Thereafter, the control unit 120 proceeds to step ST19 of FIG. 5.

As described above, in the first exemplary embodiment to which the present disclosure is applied, the connection device 10 is connected to the image display unit 20 which is a head mounted type display device. The connection device 10 includes a connector 11C as a first connection unit to which an image signal 401 as a first image signal is input. Further, the connection device 10 includes a connector 11B as a second connection unit to which an image signal 301 as a second image signal is input, the second connection unit being capable of outputting the sensor data 302 relating to an input device provided in the image display unit 20. The connection device 10 includes a connection unit 145 configured to output one of the image signal 401 input to the connector 11C and the image signal 301 input to the connector 11B to the image display unit 20. Additionally, the connection device 10 further includes a setting unit 153 configured to set selection of the image signal 401 and the image signal 301. The connection device 10 further includes an image output controller 155 configured to select a connection unit that outputs the image signal by the connection unit 145 according to the setting by the setting unit 153. The setting unit 153 sets to output the image signal 401 input to the connector 11C from the connection unit 145 in a case where image signals are input to both the connector 11C and the connector 11B.

Further, in the first exemplary embodiment to which the present disclosure is applied, the HMD 100 is a display device including an image display unit 20 which is head mounted type and is configured to display an image; and a connection device 10 connected to an external device.

According to the connection device 10 to which the connection device and the connection device control method are applied, the plurality of image signals 301 and 401 input from the PC 300 and the image output device 400 can be selected by a method that does not require setting by the user and can be displayed on the image display unit 20. For example, in a case of operating the part to be operated of the connection device 10, the user operates while visually recognizing the connection device 10 through the image display unit 20. Therefore, convenience of the user can be improved by appropriately selecting the image source from the image signals 301 and 401 without performing the operation by the user and displaying the image. The connector 11C is an interface particularly suitable for inputting the image signals while the connector 11B is a versatile interface corresponding to input and output of the image signals and data such as sensor data 302. Therefore, the possibility of the image signal input to the connector 11C being the image intended to be viewed on the image display unit 20 is higher than that of the image signal input to the connector 11B. Therefore, by selecting the image signal input to the connector 11C as the image source in preference to the image signal input to the connector 11B, the possibility that the image intended to be viewed by the user can be displayed on the image display unit 20 is high, and the image source can be appropriately selected. Additionally, the image source is selected in accordance with the setting of the setting unit 153. Thus, there is an advantage that the possibility that a selection is made not along the intention of the user is low, and the convenience of the user is not impaired.

Further, the setting unit 153 changes the setting of the selection of the image signal 401 and the image signal 301 based on the history of outputting the image signal 401 to the image display unit 20 by the connection unit 145 and based on the history of outputting the image signal 301 to the image display unit 20 by the connection unit 145.

Therefore, the history of displaying the image by the user using the HMD 100 can be reflected to the setting of the selection of the image source. Therefore, the image source can be selected according to the mode of use of the HMD 100 by the user.

For example, the setting unit 153 counts the image output time of outputting the image signal 401 to the image display unit 20 by the connection unit 145 and counts the image output time of outputting the image signal 301 to the image display unit 20 by the connection unit 145. The setting unit 153 changes the setting of the selection of the image signal 401 and the image signal 301 based on the length of the image output time. In this case, the image control data 133 can be set to select the image signals 301 and 401 according to the length of output time as the image signal 201 to the image display unit 20.

Here, the history of outputting the image signal 401 to the image display unit 20 by the connection unit 145 and the history of outputting the image signal 301 to the image display unit 20 by the connection unit 145 are not limited to the image output time. For example, the setting unit 153 may count the number of times of outputting the image signal 401 as the image source to the image display unit 20 and the number of times of outputting the image signal 301 to the image display unit 20 as the image source. The setting unit 153 may set the image control data 133 based on the count value of the number of times. Further, the setting unit 153 may obtain a frequency of outputting the image signal as the image source to the image display unit 20 as a history, and the setting unit 153 may set the image control data 133 based on the obtained frequency. Additionally, the history of outputting the image signal to the image display unit 20 by the connection unit 145 is not particularly limited as long as it is an index concerning the output of the image signal.

Further, the connection device 10 includes an image output device 400 as a first external device connected to the connector 11C; and a connection detector 152 configured to detect the PC 300 as a second external device connected to the connector 11B. The setting unit 153 counts the image output time of outputting the image signal 401 to the image display unit 20 by the connection unit 145 in association with the image output device 400. Additionally, the image output time obtained by outputting the image signal 301 to the image display unit 20 by the connection unit 145 is counted in association with the PC 300. In this case, the image control data 133 are set based on the image output time counted for each of the PC 300 and the image output device 400. Therefore, the setting can be made relating to the selection of the image source by reflecting the use status of each device connected to the connection device 10 for each device.

Additionally, the HMD 100 to which the display device, the connection device control method, and the display device control method of the present disclosure are applied can obtain the above effects by the function of the connection device 10.

2. Second Exemplary Embodiment

Figure 8:
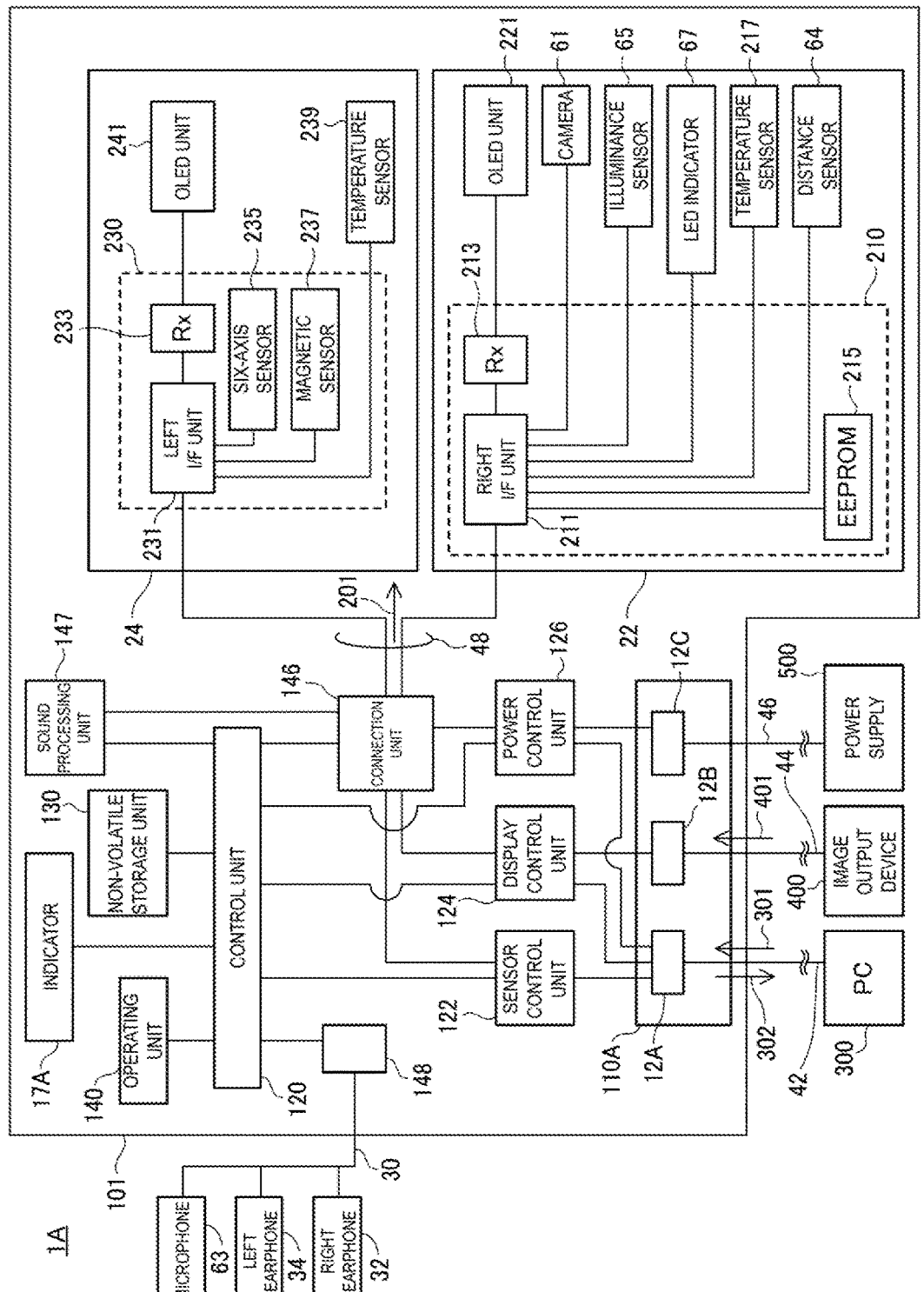
FIG. 8 is a block diagram of a display system according to Second Exemplary Embodiment.

FIG. 8 is a block diagram of a display system 1A according to the second exemplary embodiment to which the present disclosure is applied, and illustrates the configuration of an HMD 101 in detail.

The HMD 101 is a device in which functional units of the connection device 10 of FIG. 2 are integrally configured in the image display unit 20 of FIG. 2. That is, the right display unit 22 and the left display unit 24 are accommodated in the housing of the image display unit 20 illustrated in FIG. 1, together with the functional units corresponding to the connection device 10. The HMD 101 corresponds to the display device of the present disclosure.

The HMD 101 includes the control unit 120, the sensor control unit 122, the display control unit 124, the power control unit 126, the non-volatile storage unit 130, the operating unit 140, and the sound processing unit 147. These parts are configured in the same manner as in the first exemplary embodiment described above.

Additionally, the HMD 101 includes an indicator 17A. The indicator 17A is configured similarly to the indicator 17 in FIG. 2 and configured to light up according to the operation state of the HMD 101. For example, the indicator 17A is installed in the right holding part 21, the left holding part 23, or the front frame 27.

The HMD 101 includes an I/F unit 110A. The I/F unit 110A includes connectors 12A, 12B, and 12C provided in the image display unit 20. Interface specifications and configurations corresponding to the connectors 12A, 12B, and 12C are similar to those of the connectors 11B, 11C, and 11D, respectively. Therefore, the PC 300, the image output device 400, and the power supply device 500 can be connected to the I/F unit 110A. That is, the connector 12A is connected to the PC 300, and inputs the image signal 301 output from the PC 300 and outputs the sensor data 302 to the PC 300. The connector 12A corresponds to a second connection unit. Further, the connector 12B is connected to the image output device 400, and receives the image signal 401 output from the image output device 400. The connector 12B corresponds to a first connection unit.

Further, the HMD 101 also includes a connection unit 146. Similarly to the connection unit 145, the connection unit 146 connects each part including the control unit 120 to the right display unit 22 and the left display unit 24. In the HMD 101, the connection unit 146 is configured integrally with the right display unit 22 and the left display unit 24; thus, the connection cable 48 inside the device is used instead of the display unit connection cable 40 (FIG. 1). The connection cable 48 connects the right I/F unit 211 and the left I/F unit 231 to each part of the control unit 120, the sensor control unit 122, the display control unit 124, and the sound processing unit 147. The connection unit 146 outputs the image signal 201 to the right display unit 22 and the left display unit 24. The connection unit 146 functions as an output unit in the same manner as the connection unit 145.

Further, the HMD 101 includes a connecting unit 148. The connection unit 148 includes a connector to which a headset 30, having a right earphone 32, a left earphone 34, and a microphone 63, is connected.

The HMD 101 illustrated in FIG. 8 can execute each operation illustrated in FIGS. 5 to 7 by the control unit 120.

That is, the HMD 101 of the second exemplary embodiment is a device to which the display device of the present disclosure and the display device control method are applied and includes a right display unit 22 and a left display unit 24 configured to display images. The HMD 101 includes a connector 12B to which the image signal 401 is input and a connector 12A to which the image signal 301 is input, and the connector 12A being capable of outputting data relating to each sensor provided in the right display unit 22 and the left display unit 24. The HMD 101 includes an image output controller 155 configured to display an image based on any of the image signal 401 input to the connector 12B and the image signal 301 input to the connector 12A by the right display unit 22 and the left display unit 24. The HMD 101 includes a setting unit 153 configured to set selection of the image signal 401 and the image signal 301. The image output controller 155 selects one of the connector 12A and the connector 12B according to the setting by the setting unit 153, and displays the image on the right display unit 22 and the left display unit 24. The setting unit 153 sets to select the image signal 401 to be input to the connector 12B in a case where the image signals are input to both the connector 12A and the connector 12B.

According to this configuration, effects similar to those of the connection device 10 and the HMD 100 in the first exemplary embodiment can be obtained.

The appearance of the HMD 101 of the second exemplary embodiment may not be the same as the image display unit 20. Further, in the HMD 101, the I/F unit 110A may be provided separately from the other constituent parts, and a specific shape is arbitrary.

3. Other Exemplary Embodiments

The disclosure is not limited to the configurations in the exemplary embodiments described above, and the disclosure can be implemented in various aspects without departing from the gist of the disclosure.

For example, in each of the exemplary embodiments described above, the image display unit 20 is configured to visually recognize the image on the right eye and the left eye of the user by the optical systems provided in the right display unit 22 and the left display unit 24. The present disclosure is not limited to this, and for example, a configuration using a single optical member for allowing the user to view the image on both the right eye and the left eye may be adopted. Further, the HMDs 100 and 101 may be devices that allow the user to visually recognize the image only on either the right eye or the left eye of the user.

In each of the exemplary embodiments described above, the configuration has been exemplified in which the connector 11B and the connector 12A as the second connection unit are interfaces being capable of outputting data relating to sensors included in the image display unit 20. The present disclosure is not limited to this. For example, the connector functioning as the second connection unit may be an interface capable of inputting data relating to the input device included in the image display unit 20. That is, in the exemplary embodiments described above, the data relating to sensors included in the image display unit 20 may be input to the connection device from the PC 300 as an external device or other device to the connector 11B and 12A. In this way, the connectors 11B and 12A may have a configuration capable of at least one of inputting or outputting the data relating to sensors included in the image display unit 20. Additionally, as in the above exemplary embodiments, the connector 11B and 12A may be configured to be capable of both inputting and outputting the data relating to sensors included in the image display unit 20.

Further, in the first exemplary embodiment, the connector 11B is illustrated as the second connection unit to which the image signal is input and from which the sensor data 302 can be output. In the second exemplary embodiment, the connector 12A as the second connection unit is illustrated as a similar configuration. The present disclosure is not limited to this. That is, the second connection unit is not limited to the example in which one connector can execute the input of the image signal 301 and the output of the sensor data 302. For example, the second connection unit can serve as a connection unit connected to one cable capable of transmitting the image signal 301 and transmitting the sensor data 302. In this case, the number of connectors to which the cable is connected may be one, or the cable described above may branch and be connected to a plurality of connectors. The cable may be a cable that combines a line for transmitting an image signal and a line for transmitting data other than the image signal by covering. Further, the cable may be a cable that combines a cable for transmitting the image signal and a cable for transmitting the data other than the image signal and gathers into one line as it looks.

In the exemplary embodiments described above, the connection device 10 includes the connectors 11B, 11C, and 11D, and the HMD 101 includes the connectors 12A, 12B, and 12C, but the arrangement and the number of the connectors can be arbitrarily changed. The connection device 10 and the HMD 101 may include connectors as the first connection unit and the second connection unit. Additionally, in a case where the connection device 10 or the HMD 101 incorporates a battery or receives power supply by a configuration other than the connectors 11D and 12C, the connector 11D and the connector 12C can be configured to be removed.

Furthermore, the first connection unit and the second connection unit may be configured to transmit images wirelessly. Instead of or in addition to the connectors 11B, 11C, 12A, and 12B illustrated as an aspect of the first connection unit and the second connection unit, the connection device 10 and the HMD 101 may include a wireless communication unit. In this case, the connection detector 152 detects that the connection device 10 is wirelessly connected to another device.

Additionally, the image display unit 20 may be configured as a holographic display device. In this case, the image display unit 20 can be configured to include, for example, a light source and a spatial light modulator configured to modulate light from the light source. For example, as the spatial light modulator, SLM can be adopted. Specifically, a reflective spatial light phase modulator utilizing a liquid crystal known as LCOS can be used. SLM is an abbreviation for Spatial Light Modulator, and LCOS is an abbreviation for Liquid Crystal On Silicon-SLM.

Further, in each of the exemplary embodiments described above, the configuration in which the user visually recognizes the external scene through the image display unit is not limited to a configuration in which the right display unit 22 and the left display unit 24 transmit outside light. For example, the disclosure is applicable to a display device configured to display an image in a state where an external scene cannot be visually recognized. Specifically, the present disclosure can apply to a display device configured to display a captured image of the camera 61, an image or Computer Graphics (CG) generated based on the captured image, an image based on image data stored in advance or based on image data input from outside, or the like. This kind of display device can include a so-called closed type display device in which an external scene cannot be visually recognized. Further, as described in the exemplary embodiments described above, an AR display, in which an image superimposed on a real space is displayed in the real space, or an MR display, in which an imaged captured in a real space image and a virtual image are combined, may be used. Alternatively, the present disclosure is applicable to a display device configured not to perform processing such as VR display for displaying a virtual image. MR is an abbreviation for Mixed Reality and VR is an abbreviation for Virtual Reality. For example, a display device configured to display image data input from an outside or an analogue image signal is also, as a matter of course, encompassed as the application of the disclosure.

Additionally, instead of the image display unit 20, for example, an image display unit of another type such as an image display unit worn as a hat may be adopted, as long as the image display unit includes a display unit configured to display an image in correspondence with the left eye of the user; and a display unit configured to display an image in correspondence with the right eye of the user. Additionally, the display device in the disclosure may be configured, for example, as a head mounted display mounted on a vehicle such as a car and an airplane. Further, the display device may be configured, for example, as a head-mounted display built into a body protector tool such as a helmet. In this case, a portion located in a position with respect to a body of a user, and a portion located with respect to such a portion can serve as mounted parts.

Further, the functional blocks illustrated in the block diagrams of FIG. 2, FIG. 3, FIG. 4, and FIG. 8 may be configured to be implemented by hardware or may be configured to be implemented through cooperation between hardware and software, without being limited to the configuration in which independent hardware resources are disposed as illustrated in the drawings.

What is claimed is:

1. A connection device transmitting an image signal to a display device that is head-mounted, the connection device comprising:
   a first connection unit that receives a first image signal;
   a second connection unit that receives a second image signal and transmits data relating to an input device of the display device, the second image signal being different from the first image signal;
   an output control unit that selects one of the first image signal and the second image signal; and
   an output unit that outputs one of the first image signal and the second image signal that is selected by the output control unit to the display device, wherein
   when both the first connection unit has received the first image signal and the second connection unit has received the second image signal, the output control unit causes the output unit to output the first image signal to the display device.

2. The connection device according to claim 1, further comprising:
   a setting unit that acquires a history of outputting of the first image signal to the display device by the output unit and a history of outputting of the second image signal to the display device by the output unit, wherein
   the output control unit selects one of the first image signal and the second image signal based on the history of outputting that is acquired by the setting unit.

3. The connection device according to claim 2, wherein
   the setting unit counts an output time of outputting the first image signal to the display device by the output unit and an output time of outputting the second image signal to the display device by the output unit, and
   the output control unit selects one of the first image signal and the second image signal based on the output time of outputting that is counted by the setting unit.

4. The connection device according to claim 3, further comprising:
   a connection detector that detects a first external device and a second external device that is different from the first external device, wherein
   the first external device transmits the first image signal to the first connection unit,
   the second external device transmits the second image signal to the second connection unit, and the setting unit counts the output time of outputting the first image signal to the display device by the output unit in association with the first external device, and counts the output time of outputting the second image signal to the display device by the output unit in association with the second external device.

5. The connection device according to claim 1, wherein the first connection unit and the second connection unit receive the first image signal and the second image signal by a wireless communication, respectively.

6. The connection device according to claim 1, further comprising:
a connection detector that detects each of the first image signal to be received by the first connection unit and the second image signal to be received by the second connection unit.

7. A display device that is head-mounted comprising:
an image display unit that displays an image; and
a connection device that includes a first connection unit and a second connection unit, the first connection unit receives a first image signal, the second connection unit receives a second image signal and transmits data relating to an input device of the display device, the second image signal being different from the first image signal, wherein
the connection device is configured to:
select one of the first image signal and the second image signal;
output one of the first image signal and the second image signal that is selected by the connection device to the image display unit; and
when both the first connection unit has received the first image signal and the second connection unit has received the second image signal, output the first image signal to the image display unit.

8. The display device according to claim 7, further comprising:
a connection detector that detects each of the first image signal to be received by the first connection unit and the second image signal to be received by the second connection unit.

9. The display device according to claim 7, wherein
the connection device is configured to detect each of the first image signal to be received by the first connection unit and the second image signal to be received by the second connection unit.

10. A control method for a head-mounted display device, the head-mounted display device including an image display unit that displays an image and a connection device including a first connection unit and a second connection unit, the first connection unit receiving a first image signal, the second connection unit receiving a second image signal and transmitting data relating to an input device of the display device, the second image signal being different from the first image signal, the control method comprising:
selecting one of the first image signal and the second image signal; and
outputting one of the first image signal and the second image signal that is selected to the image display unit, wherein
when both the first connection unit has received the first image signal and the second connection unit has received the second image signal, outputting the first image signal to the image display unit.

* * * * *